Sept. 15, 1931. G. E. ROWE 1,823,574
GLASSWARE TRANSFER DEVICE
Filed Oct. 15, 1929
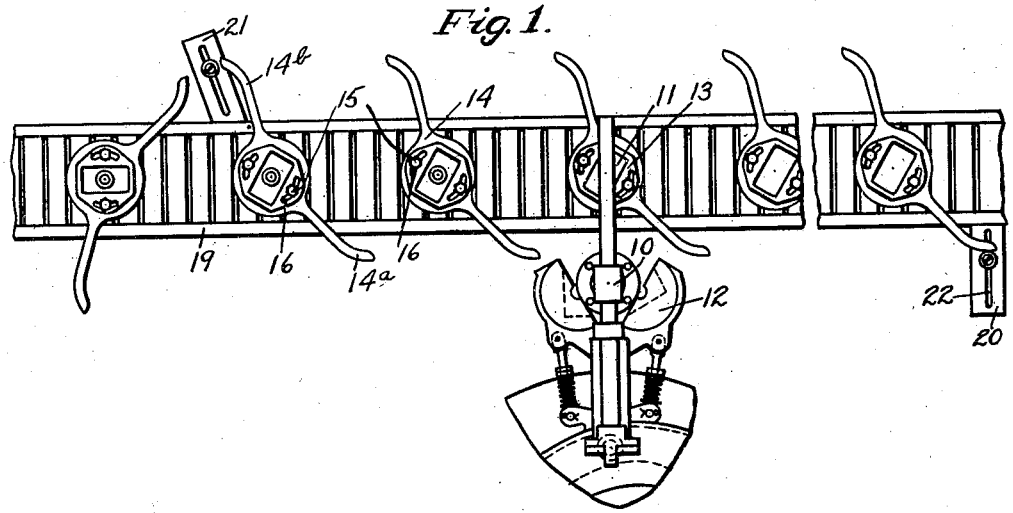
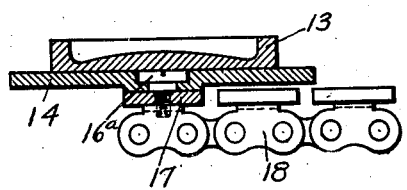
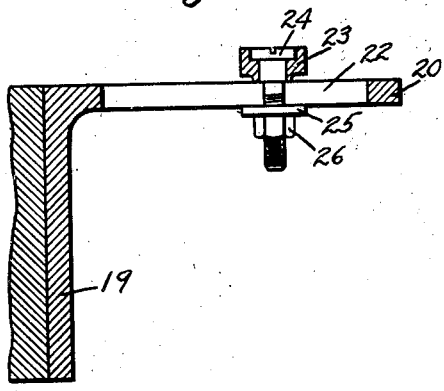
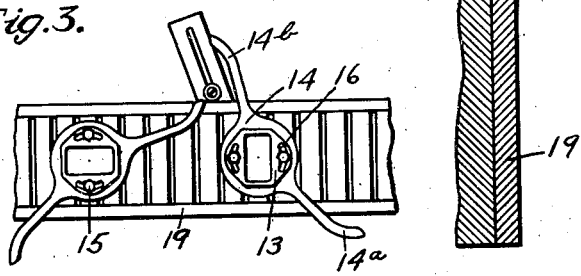
Witness:
G. A. Duberg
Inventor;
George E. Rowe
by Brown & Parham
Attorneys.

Patented Sept. 15, 1931

1,823,574

UNITED STATES PATENT OFFICE

GEORGE E. ROWE, OF WEST HARTFORD, CONNECTICUT, ASSIGNOR TO HARTFORD-EMPIRE COMPANY, OF HARTFORD, CONNECTICUT, A CORPORATION OF DELAWARE

GLASSWARE TRANSFER DEVICE

Application filed October 15, 1929. Serial No. 399,757.

This invention relates to a conveyor for articles of glassware and is more particularly designed to turn about their axes non-circular articles of glassware from one predetermined position to another, while transferring them from one location to another.

It often happens that non-circular articles of glassware are delivered by a take-out to a conveyor in such a manner that when picked up by the lehr stacker, they are not in a proper position to satisfactorily be placed in the lehr, either because they take up too much room or else they cool improperly because their corners are too closely adjacent.

An object of this invention is to provide means for receiving articles of glassware from a take-out in whatever position they happen to come, assuming that for a given set-up of a mold table the articles will always be delivered by the take-out in the same position, and turn the articles of glassware to whatever predetermined position is the satisfactory one for placing them in the lehr.

The invention comprises broadly an endless conveyor belt, bearing a series of pivotally mounted plates with ware receiving members attached thereto and arms on the plates, which arms contact with adjustable members fixed adjacent the conveyor, which turn the ware receiving members or cups first to one position for receiving the ware and to another position for delivering it.

In the drawings, Figure 1 is a plan view showing the transfer device and the relationship of the various parts thereof to a take-out mechanism;

Fig. 2 is a sectional view of a plate, and a receptacle mounted thereon, showing the pivotal connection between the plate and the conveyor;

Fig. 3 is a plan view of one section of the conveyor, showing the adjustable abutment member in a position different from that shown in Fig. 1; and Fig. 4 is a sectional view of the abutment member showing the mounting of the adjustable screw therein.

A take-out mechanism generally designated as 10 is shown delivering a bottle 11 from a mold 12 to a cup 13. A plurality of cups 13 are provided, each being secured to a plate 14 by means of bolts 15 passing through slots 16 therein. The bolts screw into the plate 14. The plate 14 as clearly shown in Fig. 2 is pivotally mounted as by a bolt 16a to a plate 17 on the conveyor 18. The plate 14 carries arms 14a and 14b which are sufficiently long to contact with abutment members hereinafter described. The conveyor may be of any form well known to the art and driven, preferably intermittently, by any means (not shown). Attached to the framework 19 of the conveyor supporting structure are two arms 20 and 21 which are alike except for their location. One is placed upon each side of the take-out mechanism and on opposite sides of the conveyor. As shown in Fig. 4, in the arms 20 and 21 are slots 22 which extend almost the length of the arm. Adjustably mounted in the slot 22 is an abutment member 23 through which a bolt 24 passes and which is held in a predetermined position in the slot by washers 25 and a nut 26. Obviously the bolt may be moved in this slot as found desirable.

Since the cups 13 are removable, varied shapes thereof may be provided in accordance with the different shapes of the ware to be placed thereon. As illustrated, they are rectangular.

In operation the abutment member 23 is so positioned that when the arm 14a contacts therewith, it will turn the plate 14 so that the cup mounted thereon will be in a position to receive in its depressed portion the article of glassware from the take-out. As the cup passes the take-out the article of glassware is placed therein by the take-out in any preferred manner known to the art, and as the conveyor moves along its path, the arm 14b contacts with a roller 23 on the arm 21. The roller on the arm 21 is so positioned that it will turn the plate 14 to whatever position is most desirable for the stacker to pick up the bottle.

It is obvious that through the several adjustments the bottle may be received in any desired position and may be turned to any other selected position during the conveyor travel.

It will be understood that the hereinbefore described embodiment of my invention is for illustrative purposes only and various changes may be made in the construction of the apparatus and in the arrangement of the parts without departing from the spirit and scope of the invention as defined in the appended claims.

I claim as my invention:

1. A glassware transfer device adapted to receive non-circular articles of glassware in one position and turn said articles of glassware around a vertical axis to a predetermined position while transferring them from one location to another, comprising a conveyor, a frame therefor, plates pivotally mounted thereon, arms on the plates, a glassware receiving cup adjustably mounted on the plates, an abutment member located on the conveyor frame and adapted to contact with the arms of the plates mounted on the conveyor to turn said plates to one position for receiving non-circular articles of glassware in one position and a similar abutment member located on the conveyor framework for turning the articles of glassware to another position for delivering them.

2. A glassware transfer device adapted to receive non-circular articles of glassware in one position and turn said articles of glassware around a vertical axis to a predetermined position while transferring them from one location to another, comprising a conveyor, a frame therefor, plates pivotally mounted thereon, arms on said plates, glassware receiving cups mounted on said plates, an abutment member located to contact with said arms and to turn said plates to one position for receiving said articles of glass, and a second abutment member located to contact with said arms and turn said articles of glassware to another position for delivering them.

Signed at Hartford, Connecticut this 11th day of October, 1929.

GEORGE E. ROWE.